(12) United States Patent
Ott

(10) Patent No.: US 11,298,695 B2
(45) Date of Patent: Apr. 12, 2022

(54) PIPETTE TIP FOR AN AUTOMATED PIPETTING DEVICE AND PRODUCTION METHOD THEREOF

(71) Applicant: TECAN TRADING AG, Mannedorf (CH)

(72) Inventor: Philipp Ott, Steg (CH)

(73) Assignee: TECAN TRADING AG, Mannedorf (CH)

( * ) Notice: Subject to any disclaimer, the term of this patent is extended or adjusted under 35 U.S.C. 154(b) by 457 days.

(21) Appl. No.: 16/309,325

(22) PCT Filed: Jul. 19, 2017

(86) PCT No.: PCT/EP2017/068200
§ 371 (c)(1),
(2) Date: Dec. 12, 2018

(87) PCT Pub. No.: WO2018/015419
PCT Pub. Date: Jan. 25, 2018

(65) Prior Publication Data
US 2019/0240653 A1 Aug. 8, 2019

(30) Foreign Application Priority Data

Jul. 22, 2016 (CH) ......................................... 950/16
Feb. 10, 2017 (CH) ......................................... 159/17
Apr. 19, 2017 (CH) ......................................... 523/17

(51) Int. Cl.
*B01L 3/02* (2006.01)
*G01N 35/10* (2006.01)
(Continued)

(52) U.S. Cl.
CPC ............. *B01L 3/0275* (2013.01); *B01L 3/021* (2013.01); *B01L 3/54* (2013.01); *B01L 9/54* (2013.01);
(Continued)

(58) Field of Classification Search
None
See application file for complete search history.

(56) References Cited

U.S. PATENT DOCUMENTS 4,714,874 A 12/1987 Morris
5,045,286 A 9/1991 Kitajima et al.
(Continued)

FOREIGN PATENT DOCUMENTS

DE 3248449 A1 7/1983
EP 1729128 A1 12/2006
WO WO-2016166729 A1 * 10/2016 ............. G01N 15/12

OTHER PUBLICATIONS

Written Opinion for corresponding PCT application No. PCT/EP2017/068200, dated Dec. 12, 2017.
(Continued)

*Primary Examiner* — Kathryn Wright
(74) *Attorney, Agent, or Firm* — Notaro, Michalos & Zaccaria P.C.

(57) ABSTRACT

The present invention relates to pipette tips for connecting to a pipette tube of a pipetting device that is used for taking up and dispensing fluids. A pipette tip is shaped as a long tube that forms a pipette body with an opening on one of its ends and the other end is designed to connect to the pipette tube. The pipette tip is characterised in that it has an electrode as a volume measuring electrode of a measuring capacitor. The present invention further relates to pipetting devices with a pipette tip, methods for determining the volume of a fluid sample in such a pipette tip, methods for recognising such a pipette tip on a pipetting device, methods for producing such a pipette tip, uses for such a pipette tip and a set of pipette tips.

19 Claims, 7 Drawing Sheets

(51) Int. Cl.
*G01F 23/263* (2022.01)
*B01L 3/00* (2006.01)
*G01D 5/241* (2006.01)
*G01N 35/00* (2006.01)
*B01L 9/00* (2006.01)
*G01F 22/00* (2006.01)
*B25J 9/16* (2006.01)

(52) U.S. Cl.
CPC ............ *B01L 9/543* (2013.01); *B25J 9/1664* (2013.01); *G01D 5/2417* (2013.01); *G01F 22/00* (2013.01); *G01F 23/263* (2013.01); *G01N 35/0099* (2013.01); *G01N 35/00584* (2013.01); *G01N 35/00732* (2013.01); *G01N 35/1011* (2013.01); *G01N 35/1016* (2013.01); *B01L 2200/0605* (2013.01); *B01L 2200/143* (2013.01); *B01L 2300/021* (2013.01); *B01L 2300/0645* (2013.01); *B01L 2400/049* (2013.01); *B01L 2400/0487* (2013.01); *G01N 2035/00811* (2013.01); *G01N 2035/103* (2013.01); *G01N 2035/1013* (2013.01); *G01N 2035/1025* (2013.01); *G01N 2035/1034* (2013.01)

(56) References Cited

U.S. PATENT DOCUMENTS

| | | | |
|---|---|---|---|
| 6,551,558 | B1 | 4/2003 | Mann |
| 2002/0001545 | A1 | 1/2002 | Cronenberg et al. |
| 2005/0279855 | A1 | 12/2005 | Baker et al. |
| 2013/0136672 | A1* | 5/2013 | Blumentritt ........... G01F 23/268 422/524 |
| 2015/0114123 | A1 | 4/2015 | Schaefer et al. |
| 2015/0115123 | A1 | 4/2015 | Schaefer et al. |
| 2018/0093263 | A1* | 4/2018 | Bonzon ................. B01L 3/0275 |

OTHER PUBLICATIONS

International Search Report for corresponding PCT application No. PCT/EP2017/068200, dated Dec. 12, 2017.

* cited by examiner

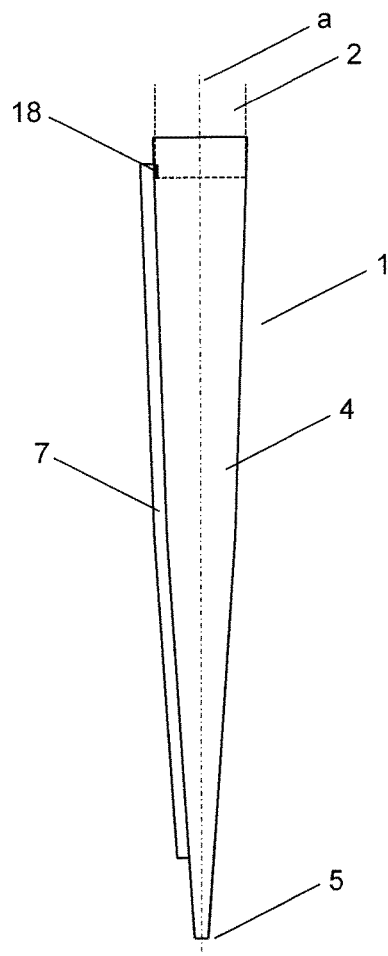
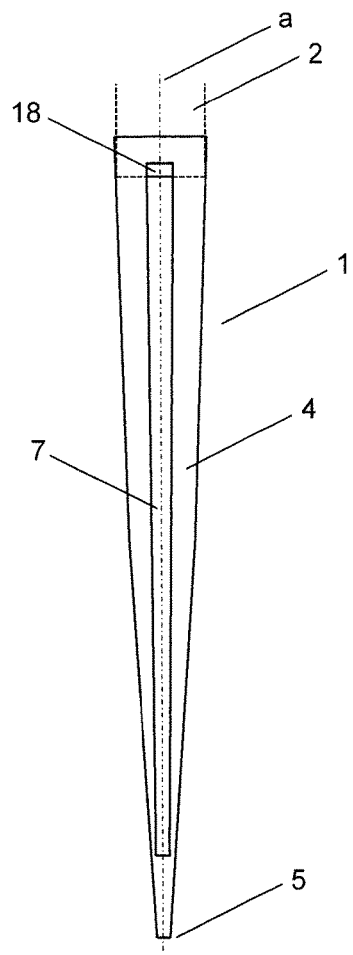
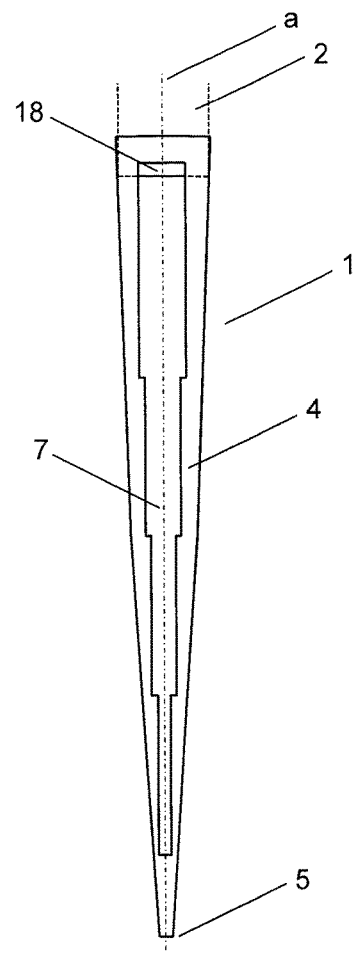
FIG. 1a)   FIG. 1c)   FIG. 1d)
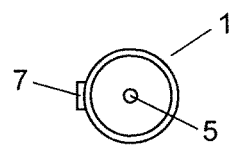
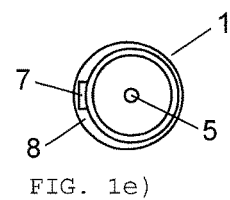
FIG. 1b)   FIG. 1e)

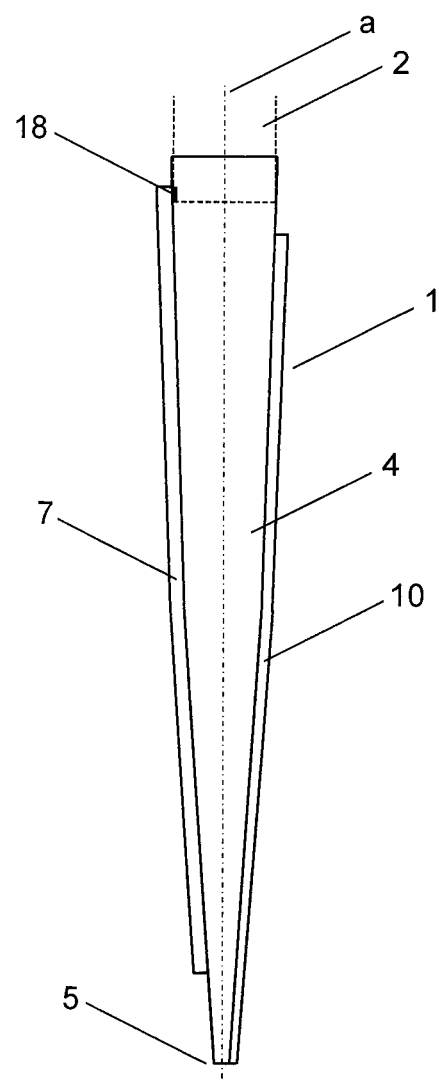
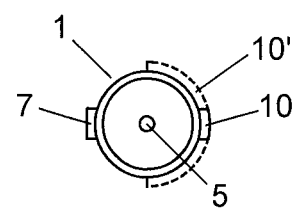
FIG. 4b)
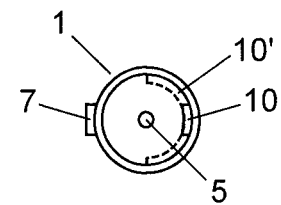
FIG. 4c)
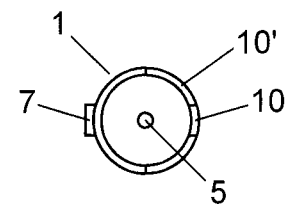
FIG. 4d)
FIG. 4a)

US 11,298,695 B2

PIPETTE TIP FOR AN AUTOMATED PIPETTING DEVICE AND PRODUCTION METHOD THEREOF

RELATED APPLICATIONS

The present application claims the priority of the Swiss patent application CH 00950/16 with filing date 22 Jul. 2016, the contents of which are hereby incorporated into the present patent application, the priority of the Swiss patent application CH 00159/17 with filing date 10 Feb. 2017, the contents of which are hereby incorporated into the present patent application, and the priority of the Swiss patent application CH 00523/17 with filing date 19 Apr. 2017, the contents of which are hereby incorporated into the present patent application.

TECHNICAL FIELD OF THE INVENTION

The present invention relates to the technical field of automated liquid processing systems and relates in particular to pipette tips, particularly for one-time use (namely disposable pipette tips abbreviated "DiTis"), which are used for pipetting liquids, i.e. for aspirating and/or dispensing liquids. Furthermore, the present invention relates to pipetting devices with such pipette tips, methods for determining the volume of a sample liquid in such pipette tips, methods for detecting such pipette tips on a pipetting device, methods for producing such pipette tips, uses of such pipette tips, and a set of such pipette tips.

BACKGROUND OF THE INVENTION

When large quantities of samples have to be examined in medical, chemical, analytical or pharmaceutical laboratories, automated laboratory systems or systems are usually used today to enable rapid and reliable processing of each individual sample. Such laboratory systems are often designed as liquid processing systems for handling liquid volumes. Such liquid processing systems comprise in particular pipettors both for aspirating and dispensing liquids or dispensers exclusively for dispensing liquids. Most laboratory applications require very precise pipetting operations to achieve satisfactory analytical accuracy. Consequently, a precise knowledge of the sample quantities or liquid volumes processed is of decisive importance.

In the Swiss patent application CH 00950/16 with filing date 22 Jul. 2016, a method is proposed which allows an accurate determination of a processed (i.e. aspirated or dispensed) liquid volume during pipetting, as well as a pipetting device which uses this method for a precise determination of the processed sample quantities or liquid volumes.

In many applications, a fresh pipette tip is used to handle each new sample. Such pipette tips are therefore designed for one-time use and are usually referred to as "disposable pipette tips" (abbreviated to "DiTis"). Depending on the application, different pipette tips are used for pipetting. It is therefore important that an automated pipetting device is capable of detecting whether a pipette tip is connected to the pipette tube at all and, in particular, whether the correct pipette tip is connected.

In the Swiss patent application CH 00159/17 with filing date 10 Feb. 2017, a method is proposed which allows the detection of a pipette tip on a pipetting device as well as a pipetting device which can automatically detect different pipette tips by means of this method.

There is therefore a need to provide suitable pipette tips, which can be used in the mentioned method for determining the volume of a sample liquid in such a pipette tip and for detecting such pipette tips on a pipetting device.

SUMMARY OF THE INVENTION

It is therefore an object of the present invention to provide a pipette tip for connection to a pipette tube of a pipetting device, with the aid of which a precise determination of the volume of a sample liquid in the pipette tip is enabled. This object is achieved according to the invention by the pipette tip indicated in claim 1.

It is a further object of the present invention to provide a pipetting device having a pipette tube for the fluid-tight connection of a proposed pipette tip at its one end, with the aid of which a precise determination of the processed sample quantities or rather liquid volumes is enabled. This object is achieved according to the invention by the pipetting device indicated in claim 13.

It is a further object of the present invention to provide a method which enables an accurate determination of the volume of a sample liquid in a proposed pipette tip. This object is achieved according to the invention by the determination method proposed in claim 16.

It is a further object of the present invention to provide a method which enables the detection of a proposed pipette tip on a pipetting device. This object is achieved according to the invention by the detection method proposed in claim 18.

It is a further object of the present invention to provide a method for producing a proposed pipette tip. This object is achieved according to the invention by the production method proposed in claim 19.

It is a further object of the present invention to specify a use of a proposed pipette tip. Such a use according to the invention is indicated in claim 21.

Furthermore, it is an object of the present invention to provide a set of pipette tips which are suitable for use with the proposed detection method. Such a set of pipette tips according to the invention is set forth in claim 23.

Specific embodiment variants according to the invention are indicated in the dependent claims.

A pipette tip according to the invention is provided for connection to a pipette tube of a pipetting device and is formed as an elongated tube, which forms a pipette body having at its one first end an opening for aspirating and/or dispensing liquids, and is formed at its other end for the (fluid-tight) connection to the pipette tube, characterized in the pipette tip has a first electrode as a volume measuring electrode of a measuring capacitor, which furthermore comprises at least a part of a sample liquid receivable in the pipette tip as a counter electrode.

In one embodiment of the pipette tip, the first electrode is located on an outer surface of the pipette body or is embedded in the pipette body.

In a further embodiment, the pipette tip is coated using a coating, which in particular covers the first electrode.

In a further embodiment of the pipette tip, the pipette body is conical or pyramidal.

In a further embodiment of the pipette tip, the pipette body consists of an electrically nonconductive material, in particular a nonconductive plastic, for example, nonconductive polypropylene, which acts in particular at least as a part of a dielectric material of the measuring capacitor.

In a further embodiment of the pipette tip, the first electrode consists of a conductive plastic, for example, conductive polypropylene. However, the first electrode can also be made of metal, for example, of copper or silver.

In a further embodiment of the pipette tip, the first electrode is in the form of a strip and extends axially along the pipette tip, and in particular has a width in a range of 0.8 mm to 5 mm, preferably in the range of 0.8 mm to 2 mm, particularly preferably 1 mm.

In a further embodiment of the pipette tip, the first electrode is in the form of a strip, extends axially along the pipette tip, and has different widths in some sections, wherein the first electrode in particular has a stepped width profile in the axial direction, and the width of the first electrode is least, for example, at the first end, and the width gradually becomes greater in steps in the axial direction.

In a further embodiment of the pipette tip, the first electrode does not extend up to the opening at the first end and in particular is spaced apart from this opening in a range from 3 mm to 6 mm, preferably in the range of 4.5 mm to 5.5 mm, particularly preferably by 5 mm.

In a further embodiment of the pipette tip, the pipette body has a conductive tip having the opening for aspirating and/or dispensing liquids as an immersion detection electrode at the first end, wherein the conductive tip in particular has a length in a range of 3 mm to 6 mm, preferably in the range of 4.5 mm to 5.5 mm, particularly preferably of 5 mm, and furthermore in particular consists of the same material as the first electrode.

In a further embodiment of the pipette tip, the first electrode does not extend up to the conductive tip (or rather is not galvanically connected thereto) and is in particular spaced apart by at least 0.3 mm from the conductive tip.

In a further embodiment of the pipette tip, the pipette tip has a second electrode as an immersion detection electrode, which is arranged in particular substantially opposite to the first electrode, and which furthermore in particular consists of the same material as the first electrode.

In a further embodiment of the pipette tip, the second electrode is located on an inner and/or outer surface of the pipette body or forms a continuous part of a wall of the pipette body, whereby a direct contact with a surrounding sample liquid (i.e., inside and/or outside the pipette tip) is enabled.

In a further embodiment of the pipette tip, the second electrode is in the form of a strip and extends axially along the tube, and spans in particular up to two-thirds of the circumference of the pipette tip, furthermore in particular spans half of the circumference of the pipette tip.

In a further embodiment of the pipette tip, the second electrode extends up to the opening at the first end.

In a further embodiment, the pipette tip is a disposable pipette tip, which is provided in particular for one-time use.

According to a further aspect of the present invention, a pipetting device comprises a pipette tube, a pressure generating means, and a (capacitance) measuring unit, wherein the pipette tube is formed at its one first end for the fluid-tight connection of a proposed pipette tip and is connected at its other end to the pressure generating means, wherein an electrical contact for establishing an electrical connection, in particular a galvanic connection, to a first electrode as a volume measuring electrode on the pipette tip is provided in a region for connecting the pipette tip, which contact is connected to the (capacitance) measuring unit, wherein the (capacitance) measuring unit is designed to determine a volume of a sample liquid located in the pipette tip as a function of a measured capacitance of a measuring capacitor, which is formed by the first electrode and at least a part of a sample liquid receivable in the pipette tip as a counter electrode.

In one embodiment of the pipetting device, the (capacitance) measuring unit is furthermore designed to detect an immersion of the pipette tip into the sample liquid with the aid of a conductive tip on the pipette tip and/or a second electrode on the pipette tip as an immersion detection electrode (or rather as an immersion contact).

In a further embodiment, the pipetting device furthermore comprises a detection unit for recognizing whether the pipette tip is connected to the first end of the pipette tube, and/or for detecting a characteristic feature of the pipette tip based on a measurement of a further capacitance, wherein the further capacitance is dependent on one or more of the following characteristics:
  a material of which the pipette tip consists;
  a geometry of the pipette tip, in particular a shape of the pipette tip, furthermore in particular a diameter and/or a length of the pipette tip;
  a coating of the pipette tip, in particular a material of which the coating of the pipette tip consists, furthermore in particular an extension or thickness of the coating of the pipette tip;
  a material of which the first and/or second electrode and/or the conductive tip consists;
  a geometry (for example, a length, width, thickness, or area) of the first and/or second electrode and/or the conductive tip.

According to a further aspect of the present invention, a method for determining a volume of a sample liquid in a proposed pipette tip comprises the following steps (=determination method):
  measuring a capacitance of a measuring capacitor comprising a first electrode on the pipette tip and a counter electrode, which is formed by at least a part of a sample liquid which is located in the pipette tip;
  determining the volume of the sample liquid in the pipette tip as a function of the measured capacitance.

In one embodiment, the determination method furthermore comprises the following step:
  detecting an immersion of the pipette tip into the sample liquid with the aid of a conductive tip on the pipette tip and/or a second electrode on the pipette tip as an immersion detection electrode (or rather as an immersion contact).

According to a further aspect of the present invention, a method for detecting (=detection method) a proposed pipette tip on a pipetting device having a pipette tube, which is formed at its one first end for the detachable receiving of a pipette tube for aspirating or rather dispensing a liquid, and which is operationally connected at its other end to a pressure generating means, wherein the method comprises a measurement of a capacitance which is dependent on one or more of the following characteristics:
  a material of which the pipette tip consists;
  a geometry of the pipette tip, in particular a shape of the pipette tip, furthermore in particular a diameter and/or a length of the pipette tip;
  a coating of the pipette tip, in particular a material of which the coating of the pipette tip consists, furthermore in particular an extension or thickness of the coating of the pipette tip;
  a material of which the first and/or second electrode and/or the conductive tip consists;

a geometry (for example, a length, width, thickness, or area) of the first and/or second electrode and/or the conductive tip.

According to a further aspect of the present invention, a method for producing (=production method) a proposed pipette tip comprises the molding of the pipette tip as an elongated tube from a first material and the molding of a first electrode made of a second material on the pipette tip, in particular on an outer surface of the tube or embedded in the tube, wherein this is performed by means of multicomponent injection molding.

In a further embodiment, the production method furthermore comprises the attachment of a conductive tip to the first end of the tube and/or the molding of a second electrode on the pipette tip, in particular on an inner and/or outer surface of the tube or as a continuous part of a wall of the tube, wherein this is performed by means of the same multicomponent injection molding method, and in particular simultaneously with the molding of the first electrode.

According to a further aspect of the present invention, a use of the proposed pipette tip for determining a volume of a sample liquid which is located in the pipette tip with the aid of a first electrode as a volume measuring electrode on the pipette tip is provided.

In one embodiment variant, the use of the proposed pipette tip for detecting an immersion of the pipette tip into the sample liquid with the aid of a conductive tip and/or a second electrode as an immersion detection electrode on the pipette tip is provided.

According to a further aspect of the present invention, a set of proposed pipette tips comprises at least two types of pipette tips, wherein the at least two types differ in that upon application of the proposed method for detecting a pipette tip, a capacitance of a first type of pipette tips lies in a first range and the capacitance of a second type of pipette tips lies in a second range, wherein the first and second range are not overlapping, and wherein the at least two types differ in particular by way of one of the following features:
  volume capacity;
  tip opening size/diameter for aspirating and dispensing a liquid;
  with or without filter for preventing contaminations of the pipette tube during the aspiration of a sample, and also in particular a type of the filter;
  purity category;
  intended use;
  volume measuring function;
  sealing capability of a connection of the pipette tip to the pipette tube, and wherein in particular the outer geometry of the at least two types can be identical.

It is to be noted that the combinations of the above-mentioned embodiment variants are possible, which in turn result in more specific embodiment variants of the present invention.

BRIEF DESCRIPTION OF THE DRAWINGS

Nonlimiting embodiment examples of the present invention are explained in more detail below by reference to the figures. In the figures:

FIG. 1a) shows a schematic illustration of a first exemplary embodiment of a pipette tip according to the invention having a strip-shaped volume measuring electrode in a view from the side;

FIG. 1 b) shows a schematic illustration of the first exemplary embodiment of a pipette tip according to the invention in a cross-sectional view from above;

FIG. 1 c) shows a schematic illustration of the first exemplary embodiment of a pipette tip according to the invention in a view from the front (of the volume measuring electrode);

FIG. 1 d) shows a schematic illustration of a second exemplary embodiment of a pipette tip according to the invention having a stepped volume measuring electrode in a view from the front;

FIG. 1 e) shows a schematic illustration of a third exemplary embodiment of a pipette tip according to the invention having a coating over the volume measuring electrode in a cross-sectional view from above;

FIG. 4a) shows a schematic illustration of a sixth exemplary embodiment of a pipette tip according to the invention having an immersion detection electrode on the outer surface of the pipette body in a view from the side;

FIG. 4 b) shows a schematic illustration of the sixth exemplary embodiment of a pipette tip according to the invention in a cross-sectional view from above;

FIG. 4 c) shows a schematic illustration of a seventh exemplary embodiment of a pipette tip according to the invention having an immersion detection electrode on the inner surface of the pipette body in a cross-sectional view from above;

FIG. 4 d) shows a schematic illustration of an eighth exemplary embodiment of a pipette tip according to the invention having an immersion detection electrode, which forms a continuous part of the wall of the pipette body, in a cross-sectional view from above;

FIG. 5 b) shows an exemplary time curve of the capacitance of a measuring capacitor having signal jumps upon the immersion and withdrawal of the pipette tip into or from the sample liquid, respectively;

FIG. 6 b) shows an exemplary time curve of the capacitance of a measuring capacitor having a linear signal increase and drop during the aspiration and dispensing of the sample liquid using the pipette tip;

In the figures, identical reference signs stand for identical elements.

DETAILED DESCRIPTION OF THE INVENTION

Figures 2A, 2B:
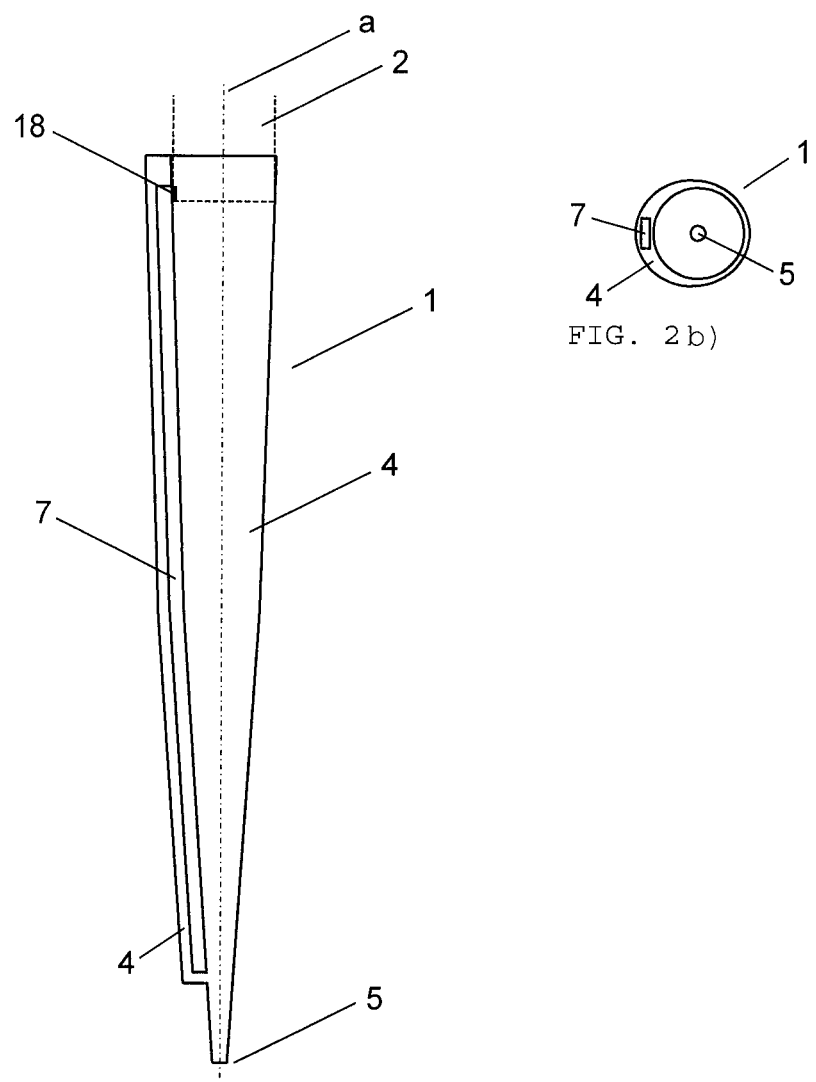
FIG. 2a) shows a schematic illustration of a fourth exemplary embodiment of a pipette tip according to the invention having a volume measuring electrode embedded in the pipette body in a view from the side.
FIG. 2b) shows a schematic illustration of the fourth exemplary embodiment of a pipette tip according to the invention in a cross-sectional view from above.

A first exemplary embodiment of a pipette tip 1 having a strip-shaped volume measuring electrode 7 is shown in a view from the side in a schematic illustration in FIG. 1*a*). The elongated tube, which forms the pipette body 4, has a substantially conical shape. However, the pipette body 4 could also be pyramidal, for example. At its one first end, the pipette body 4 has an opening 5 for aspirating and/or dispensing liquids. The other end is designed for the fluid-tight connection to the pipette tube 2, wherein the pipette tube 2 has a cone as an adapter for this purpose, for example. The volume measuring electrode 7 acts as a first electrode of a measuring capacitor, which furthermore comprises at least a part of a sample liquid receivable in the pipette tip 1 as a counter electrode. In this case, the pipette body 4 forms the dielectric material of this measuring capacitor. The volume measuring electrode 7 is arranged here as a narrow strip on the outer surface of the pipette body 4 and extends axially along the pipette tip 1 (having central axis a). The volume measuring electrode 7 has, for example, a width in a range from 0.8 mm to 5 mm, preferably in the range of 0.8 mm to 2 mm, particularly preferably of 1 mm. At its upper end, the volume measuring electrode 7 has an electrical contact 18, by means of which the volume measuring electrode 7 is galvanically connected to the pipette tube 2. FIG. 1*b*) shows this first exemplary embodiment of the pipette tip 1 in a cross-sectional view from above, and FIG. 1*c*) shows a view from the front of the volume measuring electrode 7.

A second exemplary embodiment of a pipette tip 1 having a stepped volume measuring electrode 7 is shown in a view from the front in a schematic illustration in FIG. 1*d*). Upon use of such a volume measuring electrode 7, capacity jumps (in the volume characteristic curve, i.e., the volume of the sample liquid in the pipette tip 1 as a function of the measured capacitance) occur each time the fill level of the pipette tip 1 exceeds one of the stair steps of the volume measuring electrode 7. Thus, for example, the fill level or rather the volume of the sample liquid in the pipette tip 1 can be at least roughly ascertained substantially independently of the conductivity of the sample liquid, for example, in steps of ¼, ½, ¾, 4/4 full (or also more finely as in tenths).

FIG. 1*e*) shows a third exemplary embodiment of the pipette tip 1 in a cross-sectional view from above having a coating 8 over the volume measuring electrode 7 and also over the remaining pipette body 4 (i.e., over the outer surface of the pipette tip 1). This coating 8 can be provided, for example, only in a region of the volume measuring electrode 7, for example, to prevent the volume measuring electrode 7 from coming into contact with the sample liquid when the pipette tip 1 is lowered excessively far into the sample liquid. On the other hand, the entire pipette tip 1 can be coated using a coating 8, for example, using a hydrophobic, oleophobic, or antibacterial coating 8.

A fourth exemplary embodiment of a pipette tip 1 having a volume measuring electrode 7 embedded in the pipette body 4 is shown in a view from the side in a schematic illustration in FIG. 2*a*). The volume electrode 7 can extend in this case almost up to the opening 5. The same pipette tip 1 is shown in a view from above in FIG. 2*b*). In this case, the volume measuring electrode 7 is enveloped on all sides by the material of the pipette body 4 and enclosed therein.

Figure 3:
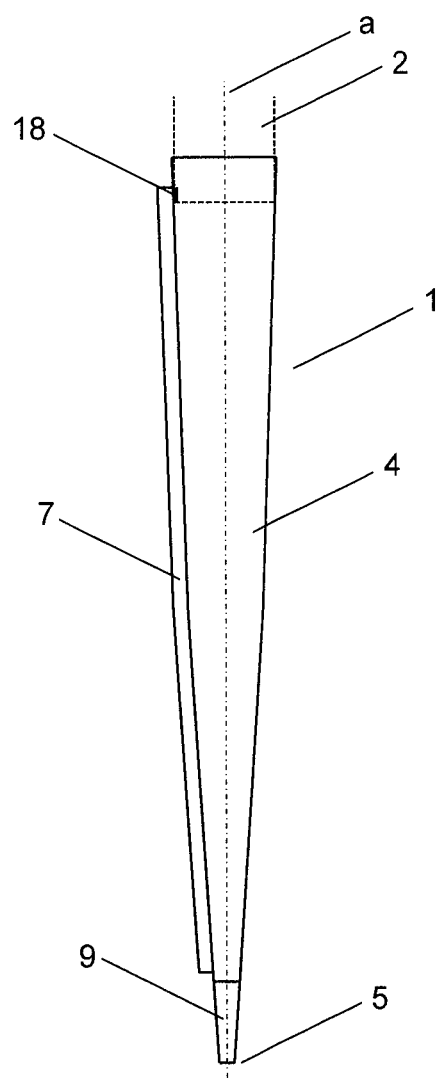
FIG. 3 shows a schematic illustration of a fifth exemplary embodiment of a pipette tip according to the invention having a conductive tip in a view from the side.

FIG. 3 shows a schematic illustration of a fifth exemplary embodiment of a pipette tip 1 in a view from the side which, in contrast to the first exemplary embodiment, has a conductive tip 9 having the opening 5 for aspirating and dispensing the sample liquid. This conductive tip is used as an immersion detection electrode (or rather contact), with the aid of which it can be established when the pipette tip 1 touches or rather penetrates the surface of the sample liquid and is immersed therein (→"capacitive liquid level detection", cLLD). The conductive tip 9 has, for example, a length in a range of 3 mm to 6 mm, preferably in the range of 4.5 mm to 5.5 mm, particularly preferably of 5 mm, and consists, for example, of the same material as the volume measuring electrode 7.

FIG. 4*a*) shows a schematic illustration of a sixth exemplary embodiment of a pipette tip 1, which, in addition to the volume measuring electrode 7, has a second electrode as an immersion detection electrode (or rather contact) 10. With the aid of this immersion detection electrode 10, it can be established (as with the conductive tip 9) when the pipette tip 1 touches or rather penetrates the surface of the sample liquid and is immersed therein (→cLLD). The immersion detection electrode 10 is arranged substantially opposite to the volume measuring electrode 7 and consists, for example, of the same material as the first electrode 7. As shown in FIGS. 4*b*), 4*c*), and 4*d*), the immersion detection electrode 10 can be arranged on an outer (=sixth exemplary embodiment) or inner (=seventh exemplary embodiment) surface of the pipette body 4 (or also on both surfaces, connected at the opening 5) or can form a continuous part of a wall of the pipette body 4 (=eighth exemplary embodiment). As can also be seen from FIGS. 4*b*), 4*c*), and 4*d*), the immersion detection electrode 10 can be formed as a strip and can extend axially along the pipette body 4 and also, for example, span half of the circumference of the pipette tip 1. Furthermore, the immersion detection electrode 10 extends up to the opening 5 so that it comes into contact with the sample liquid upon immersion therein. In contrast thereto, the volume measuring electrode 7 cannot come into contact with the sample liquid, so that it does not extend up to the opening 5, for example, and is spaced apart therefrom, as shown in FIG. 4*a*).

Figures 5A, 5B:
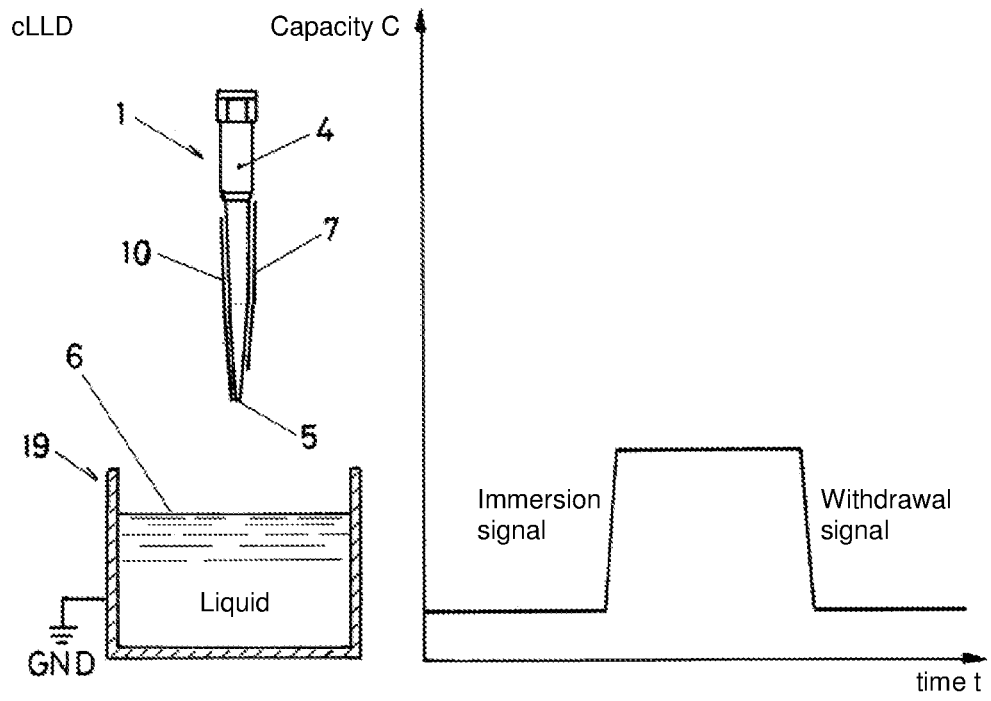
FIG. 5a) shows a schematic illustration of an immersion and withdrawal procedure of the sixth exemplary embodiment of a pipette tip according to the invention in a container having a sample liquid.

FIG. 5*a*) illustrates, in a schematic illustration, a use of the pipette tip 1 according to the sixth exemplary embodiment for immersion detection (→cLLD), i.e., for determining the point in time when the pipette tip 1 is immersed into (and withdrawn from) a sample liquid 6 which is located in a container 19, for example, a trough, a sample tube, or a "well" in a microplate. As can be seen from the time curve of the measured capacitance in FIG. 5*b*), the capacitance increases suddenly as soon as the immersion detection electrode 10 touches the sample liquid 6 and is immersed therein, and then drops suddenly again as soon as the immersion detection electrode 10 is withdrawn from the sample liquid 6.

Figures 6A, 6B:
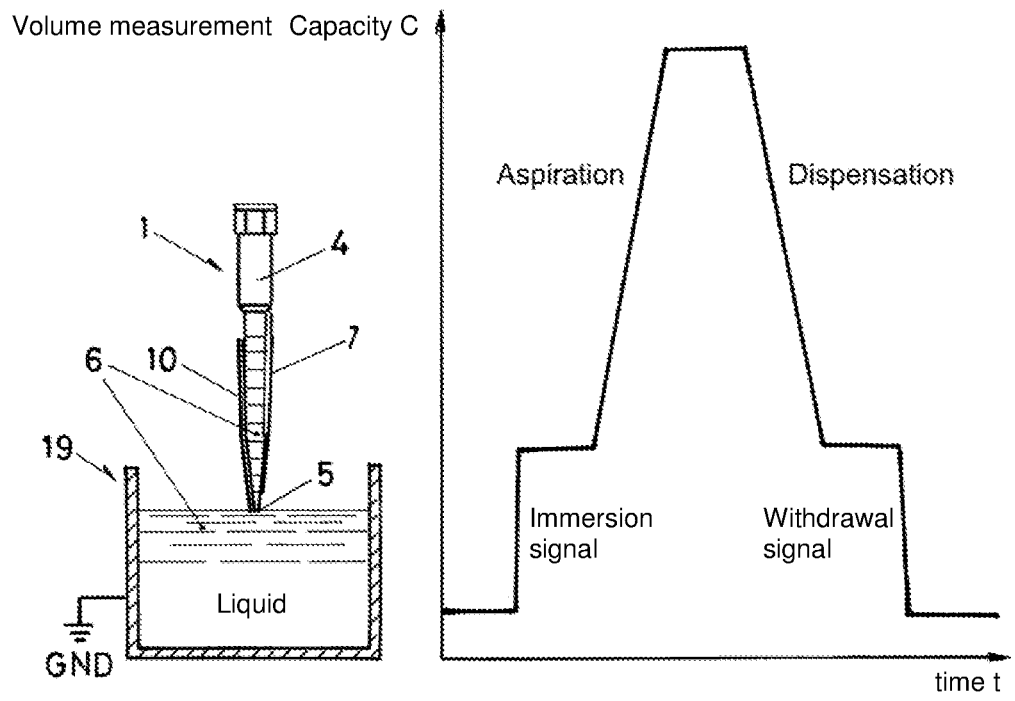
FIG. 6a) shows a schematic illustration of an aspiration and dispensation procedure of the sixth exemplary embodiment of a pipette tip according to the invention in the container having the sample liquid.

FIG. 6*a*) illustrates the use of the pipette tip 1 according to the sixth exemplary embodiment for measuring the volume of the sample liquid 6, which is located in the pipette tip 1 during the aspiration and dispensation. As can be seen from the time curve of the measured capacitance in FIG. 6*b*), the capacitance increases suddenly as soon as the immersion detection electrode 10 touches the sample liquid 6 and is immersed therein, then increases linearly (in dependence on the shape of the pipette tip 1 and the geometry of the volume measuring electrode 7) as a result of the gradually taller sample liquid column in the pipette tip 1, which forms a counter electrode becoming gradually larger in relation to the volume electrode 7, then drops linearly upon dispensing and finally makes a jump downward again as soon as the immersion detection electrode 10 is withdrawn from the sample liquid 6.

Figure 7:
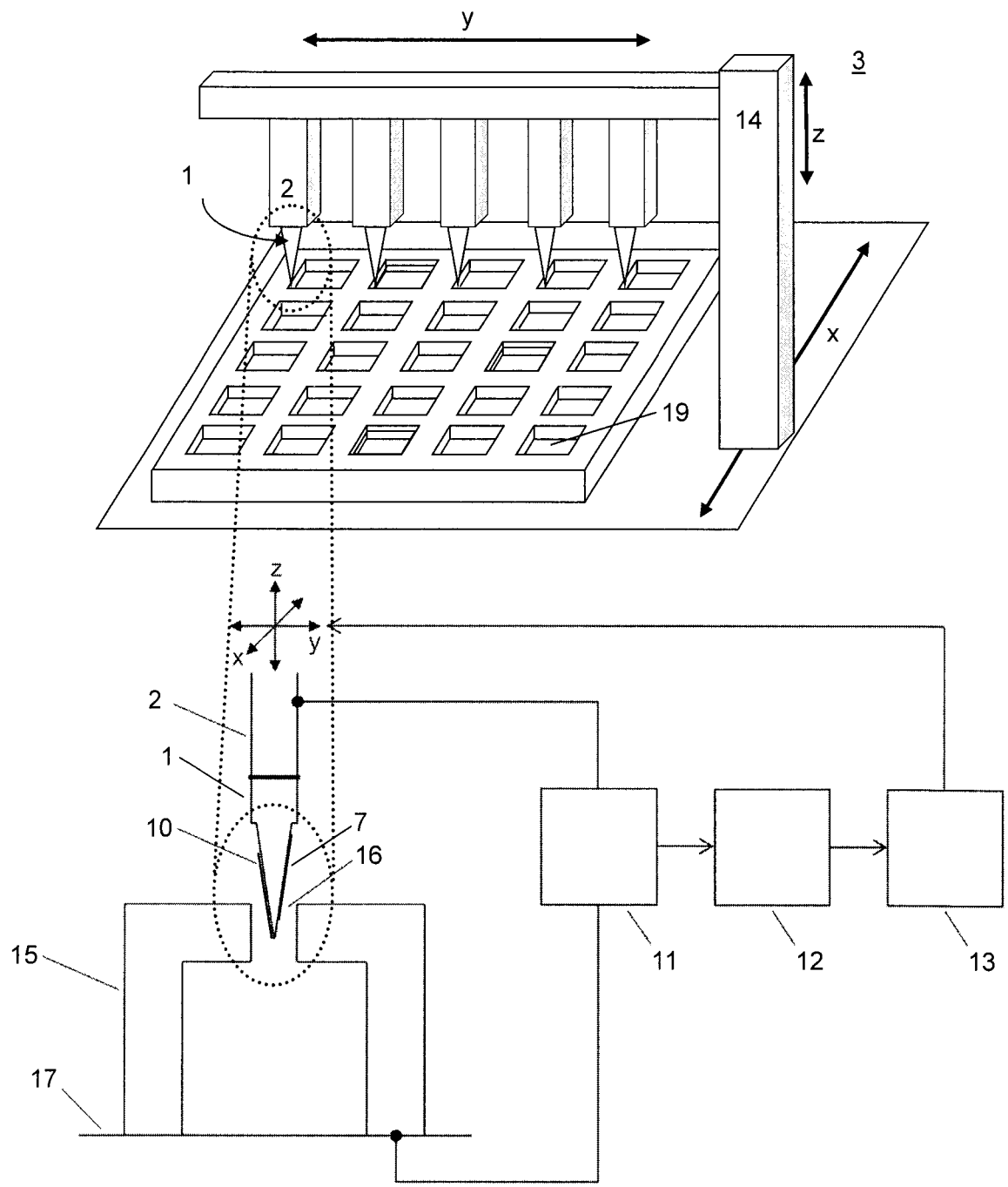
FIG. 7 shows a schematic illustration of an exemplary embodiment of a pipetting device according to the invention or rather a liquid processing system according to the invention.

FIG. 7 illustrates, in a simplified schematic illustration, an exemplary embodiment of a pipetting device according to the invention. This figure shows the pipette tube 2 having an attached pipette tip 1, which was previously taken from a receptacle 16 of a pipette tip holder 15 and is now moved vertically upward by a robot arm 14 on a liquid processing system 3 and is thus removed from the pipette tip holder 15. In this case, a capacitance measuring unit 11, which is connected to the pipette tube 2 and thus also to the pipette tip 1 as the first electrode and is connected to the worktable or rather the worksurface 17 and thus also to the pipette tip holder 15 (or a component thereof) as the second (counter) electrode, can determine the (absolute) capacitance of the measuring capacitor comprising these two electrodes. Depending on the type or nature (for example, size/volume capacity) of the pipette tip 1, the measured value of the capacitance will be different. For this purpose, the measured value of the capacitance is compared in a detection unit 12 to various reference values, wherein each reference value is characteristic of a specific type or a specific nature of pipette tip 1. The detection unit 12 then relays an item of information as to whether a pipette tip 1 is connected to the pipette tube 2, and if so which type or nature of pipette tip 1 it is, to a control unit 13 of a drive for the robot arm 14.

Such a pipette tip holder 15 can also be part of the liquid processing system 3, for example, wherein the robot arm 14 for determining the capacitance and thus for detecting the pipette tip type or rather the pipette tip size moves the pipette tube 2 having connected pipette tip 1 toward the pipette tip holder 15 in each case and lowers it into the receptacle 16 for the capacitance measurement. The pipette tip holder 15 thus represents a separate/dedicated "measuring station" for the pipette tip detection inside the liquid processing system 3.

Figures 8A, 8B, 8C:
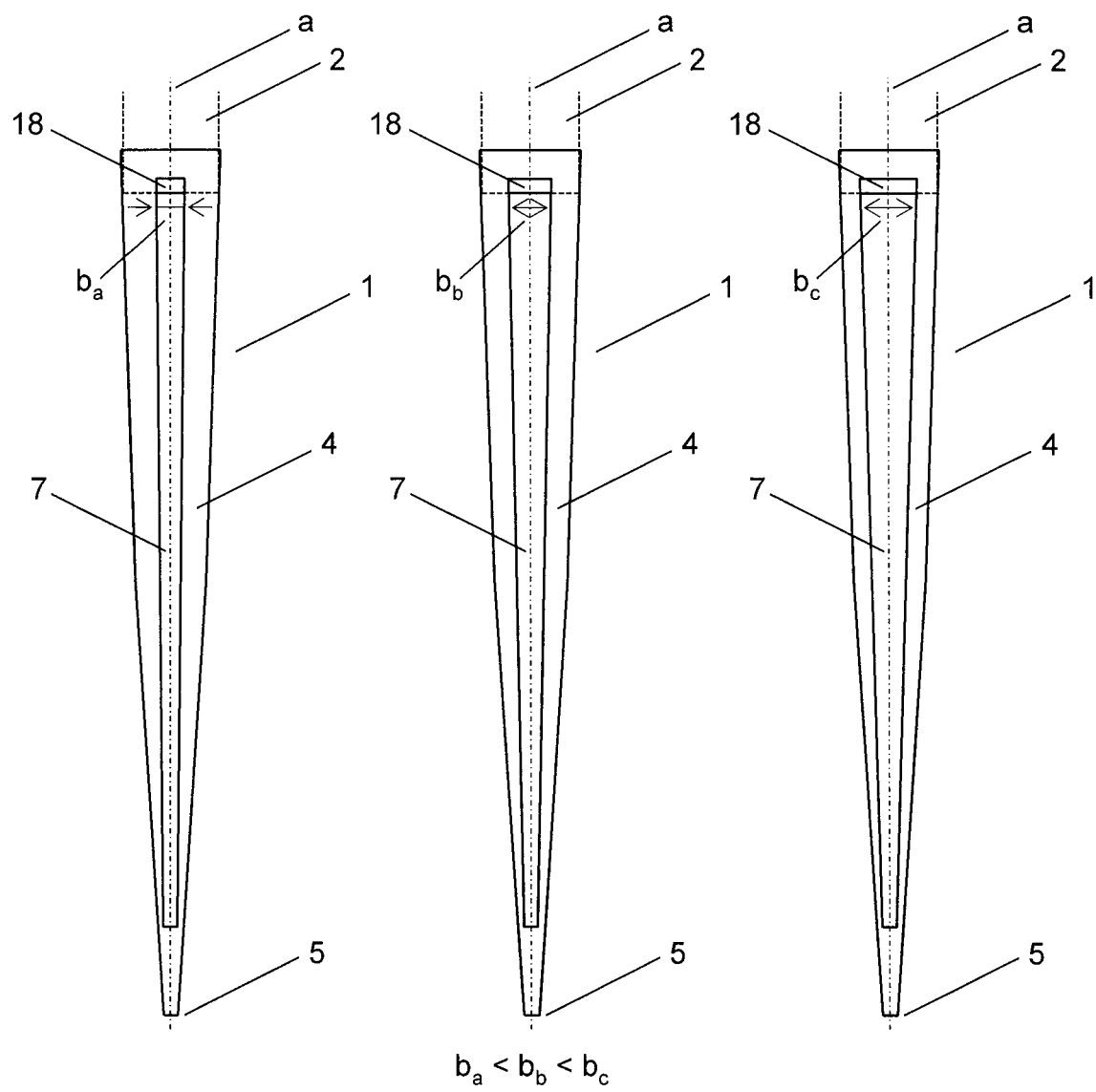
FIGS. 8a), b) and c) show schematic illustrations of three exemplary pipette tips according to the invention having electrodes of different widths, which form a set of three differentiable types of pipette tips.

Finally, FIGS. 8*a*)-*c*) show a schematic illustration by way of example of three pipette tips 1 having electrodes 7 (or 10) of different widths, which form a set of three differentiable types of pipette tips 1, which can be differentiated from one another and detected by means of the proposed detection method based on the different capacitances, which result because of the different widths $b_a < b_b < b_c$ of the electrodes 7 (or 10).

LIST OF REFERENCE NUMERALS 1 pipette tip
2 pipette tube
3 pipetting device
4 pipette body
5 opening at the one first end of the pipette body
6 (sample) liquid
7 first electrode, volume measuring electrode
8 electrically insulating layer/coating (over the first electrode and the pipette body)
9 conductive tip, immersion detection electrode/contact
10 second electrode, strip-shaped immersion detection electrode/contact
10' second electrode, immersion detection electrode/contact comprising half of the circumference of the pipette tip
11 (capacitance) measuring unit
12 detection unit
13 control unit for movement control of the drive of the pipetting robot
14 pipetting robot including drive
15 pipette tip holder/carrier
16 receptacle for a pipette tip
17 worktable/worksurface
18 electrical contact
19 container, for example, a microplate having wells
a axis of the pipette tip
$b_a$ electrode width a
$b_b$ electrode width b
$b_c$ electrode width c
x first horizontal movement axis of the pipetting robot (for example, forward and backward)
y second horizontal movement axis of the pipetting robot (for example, left and right)
z vertical movement axis of the pipetting robot (downward and upward)

The invention claimed is:

1. Pipette tip (1) for connection to a pipette tube (2) of a pipetting device (3), wherein the pipette tip (1) comprises an elongated tube, which forms a pipette body (4), which has at its one first end an opening (5) for aspirating and/or dispensing liquids (6), and is formed at its other end for connection to the pipette tube (2), wherein the pipette tip (1) further comprises a first electrode (7) as a volume measuring electrode of a measuring capacitor, which further comprises at least a part of a sample liquid receivable in the pipette tip as a counter electrode, and wherein the first electrode (7) is in the form of a strip, extends axially along the pipette tip (7), and sectionally has different widths, wherein the first electrode (7) has a stepped width profile in the axial direction, wherein the width of the first electrode (7) is smallest at the first end and the width becomes greater in steps in the axial direction, and wherein the pipette tip (1) further comprises a second electrode (10) as an immersion detection electrode, wherein the second electrode (10) extends up to the opening (5) at the first end.

2. Pipette tip (1) according to claim 1, wherein the first electrode (7) is located on an outer surface of the pipette body (4) or is embedded in the pipette body (4).

3. Pipette tip (1) according to claim 1, wherein the pipette body (4) consists of an electrically nonconductive material, acts as at least a part of a dielectric material of the measuring capacitor.

4. Pipette tip (1) according to claim 3, wherein the pipette body (4) consists of a nonconductive polypropylene.

5. Pipette tip (1) according to claim 1, wherein the first electrode (7) does not extend up to the opening (5) at the first end.

6. Pipette tip (1) according to claim 5, wherein the first electrode (7) is spaced apart from the opening (5) in a range of 3 mm to 6 mm.

7. Pipette tip (1) according to claim 1, wherein the second electrode (10) is arranged substantially opposite to the first electrode (7) and consists of the same material as the first electrode (7).

8. Pipette tip (1) according to claim 1, wherein the pipette body (4) has, at the first end, a conductive tip (9) having the opening (5) for aspirating and/or dispensing liquids (6) as an immersion detection electrode.

9. Pipette tip (1) according to claim 1, wherein the second electrode (10) is located on an inner and/or outer surface of the pipette body (4) or forms a continuous part of a wall of the pipette body (4).

10. Pipette tip (1) according to claim 1, wherein the second electrode (10) is in the form of a strip and extends axially along the tube and spans up to two-thirds of the circumference of the pipette tip (1).

11. Pipette tip (1) according to claim 1, wherein the pipette tip (1) is a disposable pipette tip.

12. Pipetting device (3) comprising a pipette tube (2) according to claim 1, a pressure generating means, and a measuring unit (11), wherein the pipette tip (1) is connected to the pipette tube (2) at its one first end in a fluid-tight manner and is connected at its other end to the pressure generating means, wherein an electrical contact (18) for establishing an electrical connection to the first electrode (7) as a volume measuring electrode on the pipette tip (1) is provided in a region for connecting the pipette tip (1), which is connected to the measuring unit (11), wherein the measuring unit (11) is designed to determine a volume of a sample liquid (6) located in the pipette tip (1) as a function of a measured capacitance of a measuring capacitor, which is formed by the first electrode (7) and at least a part of a sample liquid (6) receivable in the pipette tip (1) as a counter electrode.

13. Pipetting device (3) according to claim 12, wherein the measuring unit (11) is furthermore designed to detect an immersion of the pipette tip (1) into the sample liquid (6) with the aid of a conductive tip (9) on the pipette tip (1) and/or the second electrode (10) on the pipette tip (1) as an immersion detection electrode.

14. Pipetting device (3) according to claim 12, furthermore comprising a detection unit (12) for detecting whether the pipette tip (1) is connected to the first end of the pipette tube (2), and/or for detecting a characteristic feature of the pipette tip (1) based on a measurement of a further capacitance, wherein the further capacitance is dependent on a geometry of the first and/or second electrode (7, 10) and/or a conductive tip (9) having the opening (5) for aspirating and/or dispensing liquids (6) as an immersion detection electrode.

15. Method for determining a volume of a sample liquid (6) in a pipette tip (1) according to claim 1, wherein the method comprises the following steps:
    measuring a capacitance of a measuring capacitor comprising a first electrode (7) on the pipette tip (1) and a counter electrode, which is formed by at least a part of a sample liquid (6) which is located in the pipette tip (1);
    determining the volume of the sample liquid (6) in the pipette tip (1) as a function of the measured capacitance.

16. Method according to claim 15, furthermore comprising the following step:
    detecting an immersion of the pipette tip (1) into the sample liquid (6) with the aid of the conductive tip (9) on the pipette tip (1) and/or the second electrode (10) on the pipette tip (1) as an immersion detection electrode.

17. Method according to claim 15, wherein the measured capacitance jumps when a fill level of the pipette tip (1) exceeds one of the stair steps of the volume measuring electrode (7), thus indicating that the volume of a sample liquid (6) in the pipette tip (1) has reached a certain amount.

18. Method according to claim 15, wherein each stair step of the volume measuring electrode (7) results in a capacity jump which corresponds to a certain volume of the sample liquid (6) in the pipette tip (1).

19. Method according to claim 15, wherein the volume of the sample liquid (6) in the pipette tip (1) can be determined independently of the conductivity of the sample liquid (6).

\* \* \* \* \*